United States Patent [19]
Lindner

[11] Patent Number: 4,527,452
[45] Date of Patent: Jul. 9, 1985

[54] CUTTING DEVICE FOR CUTTING ELONGATED PROFILES INTO SECTIONS

[76] Inventor: Karl-Rainer Lindner, Stockhausstr. 11, 4010 Hilden im Rheinland, Fed. Rep. of Germany

[21] Appl. No.: 601,140

[22] Filed: Apr. 16, 1984

[30] Foreign Application Priority Data

Apr. 19, 1983 [DE] Fed. Rep. of Germany ....... 3314114

[51] Int. Cl.³ ............................................. B21D 43/28
[52] U.S. Cl. ........................................ 83/209; 83/364; 83/367; 83/371; 226/45; 200/153 LB
[58] Field of Search ................. 83/209, 210, 211, 212, 83/364, 208, 367, 370, 371, 372; 82/48; 10/87, 107 PH; 226/45, 33; 200/46, 153 LB

[56] References Cited

U.S. PATENT DOCUMENTS

| | | | |
|---|---|---|---|
| 3,522,750 | 8/1970 | Shallenberg | 83/210 X |
| 3,893,357 | 7/1975 | Zahlaus | 83/212 X |
| 4,017,014 | 4/1977 | Luscher | 226/45 |
| 4,082,022 | 4/1978 | Horn et al. | 83/212 X |
| 4,283,974 | 8/1981 | Kline | 83/364 X |

Primary Examiner—James M. Meister
Assistant Examiner—John L. Knoble
Attorney, Agent, or Firm—Michael J. Striker

[57] ABSTRACT

A device is provided for aligning elongated tubes to be cut into tube sections with a saw blade for cutting the tubes, wherein elongated tubes are provided with cutouts spaced from each other at equal intervals and defining raster marks at which tubes are to be cut into tube sections, the aligning device including a plurality of scanning fingers mounted in contact with the elongated tube to be cut into tube sections and spaced from each other along the elongation of the tube a distance substantially smaller than the interval between adjacent cutouts on the tube. A drive device for rotation and axial displacement of each tube is provided. At least one of the scanning fingers is engageable in one of the cutouts upon the rotation and axial displacement of the tube so that the distance between the saw and the cutout can be determined and the tube can be accurately aligned with the saw.

16 Claims, 17 Drawing Figures

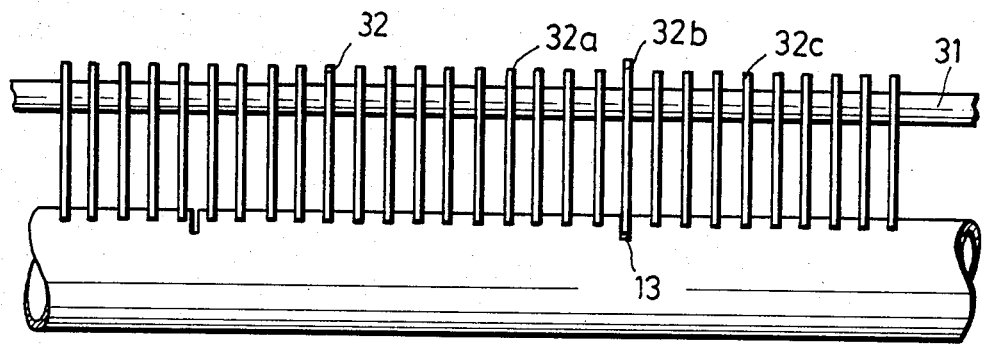
FIG. 6
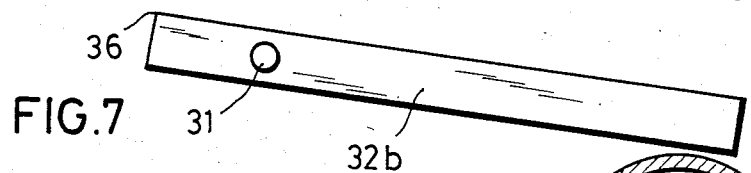
FIG. 7
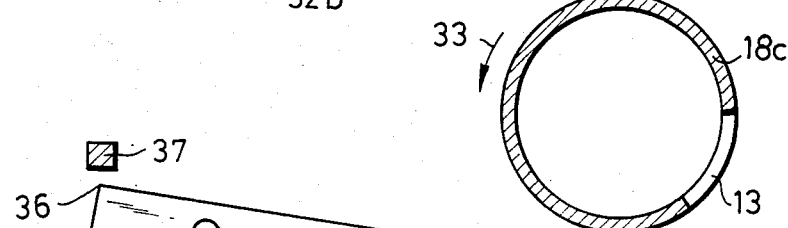
FIG. 8
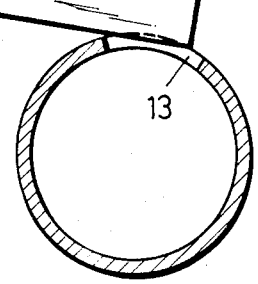
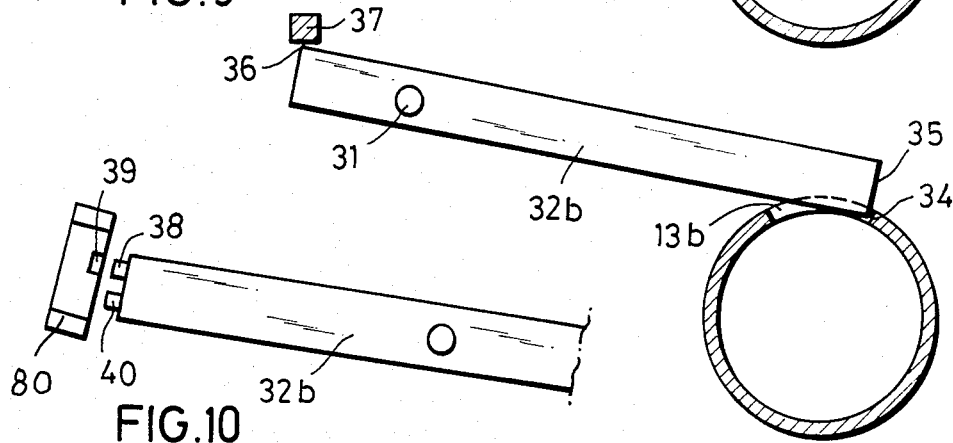
FIG. 9
FIG. 10

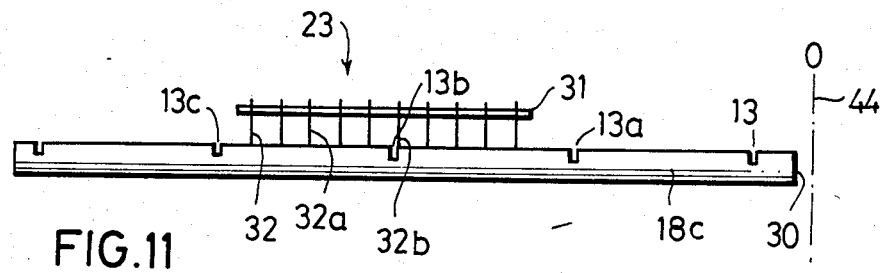
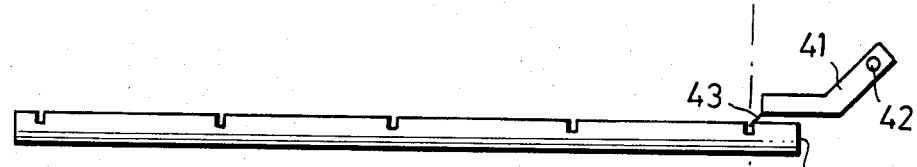
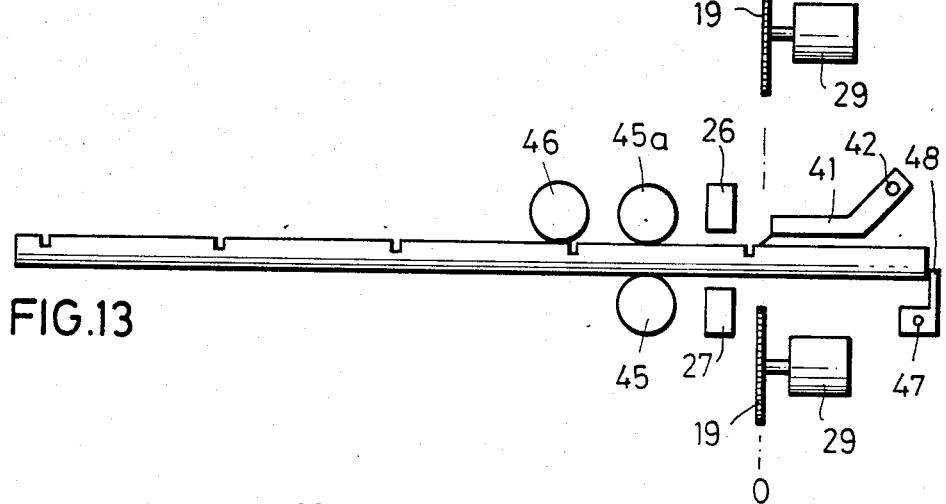
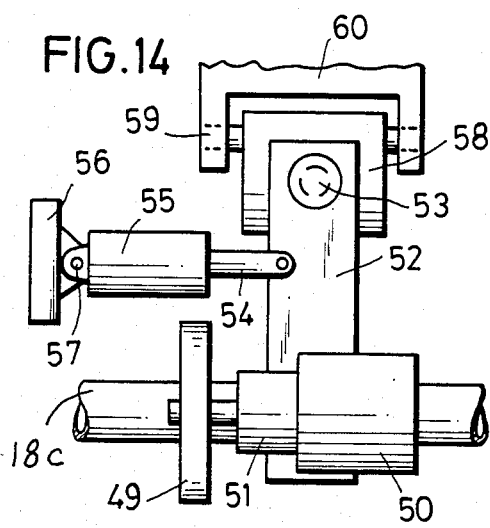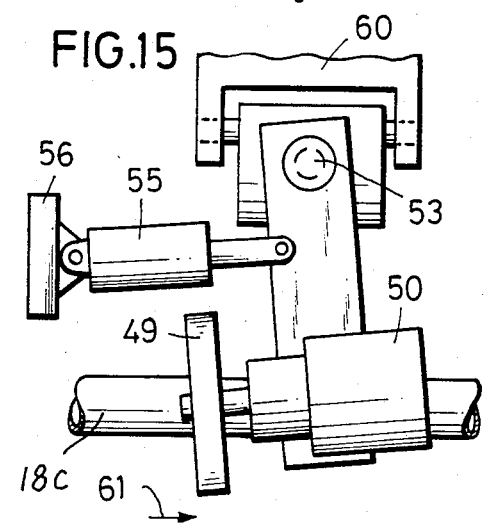

CUTTING DEVICE FOR CUTTING ELONGATED PROFILES INTO SECTIONS

BACKGROUND OF THE INVENTION

The present invention relates to a device for cutting elongated profiles into sections. More particularly, the present invention pertains to a device for aligning a raster mark provided on the elongated profile with a saw blade. The proposed device is especially suitable for tubes provided with perforated regions spaced from each other, which tubes are to be cut into sections at predetermined areas between the perforated regions whereby raster marks are provided at certain intervals on the surface of the elongated tube. These raster marks can be formed as projections or depressions extended transversely of the elongation of the tube and can be made as cutouts by stamping-out.

The profiles, subject of the present application, are known as tubes having perforated regions and employed in mufflers in exhaust systems of motor vehicles.

Depending on the system of the muffler, basically on the dimensions and other requirements of the muffler tube certain perforations are provided in the muffler tube, which perforations are usually formed on the periphery of the tube and extend over a predetermined region. The length of this perforated region varies for various exhaust systems and various sizes of the tubes. Furthermore, this perforated region has, depending on the muffler system, a predetermined location relative to the edges of the tube. In order to ensure the position of the perforated region on the tube, this region should be provided at the certain distance from the front and rear end of the tube.

Exhaust tubes are usually comprised of an inner tube having the perforated region and an outer tube. Both tubes are connected to each other by washers welded to the tubes. The exhaust tubes must be sealed, otherwise the sound-absorbing properties of those tubes will be reduced. Therefore it is necessary during the manufacturing of these tubes to ensure that inner and outer tubes to be welded to each other be produced of the same length. Certain difficulties in the production of such tubes have occurred in practice.

Elongated sheet metal strips are utilized for making tubes with perforated portions. Perforations are usually formed at certain regions on the flat strip by a stamping tool. Then raster marks are formed at certain intervals on the blank to define the distances between the perforated regions and the edges of the finished tubes produced from the blank. These marks are formed by cutouts which extend transversal to the direction of elongation of the blank. These cutouts can be made simultaneously with making perforations on the tube blank to ensure that these cutouts are positioned at regular intervals between the perforated regions.

After the perforations and cutouts have been formed on the strip-like blank the latter is bent into a tube and an elongated weld seam is provided at the opposite edges of the bent tube. This process is named as a drawing-out method. This method results in stretching-out of the tube material. Due to such stretching-out round perforations made in the flat blank become oval and have, depending on the thickness and type of material, various dimensions so that the distance between the transversal cutout or mark and the edge of the perforation region on the finished tube is changed.

As mentioned above, perforated tubes are manufactured from the flat strip, then bent into the tubes and welded at the elongated edges. Then elongated tubes are cut into tube sections of the length of 6, 8, 10 or 12 m. During the cutting of each elongated tube piece into a plurality of tube sections, particularly in mass production, it is impossible to make a cut which would be accurate in the radial plane through which the mark or cutout extends. Even if the length of manufactured cut tube sections differs from a required one in a couple of millimeters, the tube sections should be thrown away as waste.

For cutting elongated tubes into sections by a saw blade relatively long tubes of 6 to 12 m are placed into a tube supply magazine. The tubes within the magazine are separated from each other and fed to feeding rollers which in cooperation with drive wheels lying on the tube transport the latter to the saw blade. The alignment of the tube to be cut with the saw by positioning the cutouts on the side of the tube opposite to the saw blade and by positioning the saw blade in the radial plane of the cutout has been carried out by hand. Such an alignment and adjustment of the tube and the saw by hand has been always difficult and required a high concentration and rationalization from a personnel. Moreover, such an adjustment carried out by hand caused a lot of waste due to the requirement that the perforated inner tubes of the exhaust tubes should have the same length as the outer tubes. Since no perforations and only marks have been required for the outer tubes the errors in the lengths of the inner tubes have been added to the errors in length of the outer tubes. Efforts have been made to manufacture inner and outer tubes of the same length with the least possible tolerances.

It has been necessary to meet those tolerances because the muffler is provided with further tubes which are connected to the motor vehicle at a precisely determined position.

SUMMARY OF THE INVENTION

It is an object of the present invention to provide an improved device for aligning elongated profiles with a saw for cutting the profiles into sections of a predetermined length.

It is a further object of the invention to provide an aligning device which would ensure that the profile sections of the same length would be produced in the cutting device.

These and other objects of the present invention are attained by a device for aligning elongated profiles, particularly tubes having perforated portions, with a saw blade for cutting the tubes into tube sections, wherein elongated tubes are provided with cutouts spaced from each other at equal intervals and defining raster marks at which tubes are to be cut into tube sections, the aligning device comprising scanning means, including a plurality of scanning fingers mounted in contact with the elongated tube to be cut into tube sections and spaced from each other along the elongation of the tube a distance substantially smaller than the interval between adjacent cutouts on the tube; and drive means for rotation and axial displacement of each tube, at least one of said scanning fingers being engageable in one of said cutouts upon the rotation and axial displacement of the tube.

By means of a number of scanning fingers at least one of the scanning fingers, which moves into the cutout like a pawl in a very short period of time during the movement of the profile, particularly the elongated tube, is engaged in the cutout on the tube. This mechanical scanning is advantageous because it is reliable. This mechanical scanning of the location of the cutout or raster mark on the tube does not depend on the material of the tubes, the thickness of the material, its electrical conductivity, the condition of the outer surface of the tube which can be rough or soiled, for example covered with oil and therefore would be reflective for an electrical or optical scanning device. The proposed mechanical scanning by means of a plurality of scanning fingers distributed over the area of the tube in the direction of elongation of the tube and spaced from each other at small intervals is advantageous because this scanning does not depend upon the perforated region since the scanning fingers are not engageable in the perforations.

According to a further feature of this invention the scanning means may further include a pivot shaft pivotally supporting said scanning fingers, said shaft extending in parallel with the elongated tube to be cut.

Each scanning finger may be provided with an electrical contact, the scanning means further including a plurality of additional electrical contacts each cooperating with the respective first mentioned electrical contact upon pivoting of the respective scanning finger into the engagement with one of said cutouts.

When one of the scanning fingers is engaged in one of the cutouts a signal is produced, which would cause stopping of the axial displacement and rotation of the tube because the position of the raster mark defined by that cutout is accurately sensed. This sensed position can be supplied as a value signal to a control device which would cause a corresponding displacement of the saw blade to make a cut in the tube.

According to still another feature of the invention each of the scanning fingers may be a lever having a first arm and a second arm, both supported on said pivot shaft, said first arm having an end engageable in one of said cutouts, said second arm including two electrical contacts, said scanning means further including an additional electrical contact, one of said two electrical contacts cooperating with said additional contact when said end is partially engaged in one of said cutouts to produce a signal to stop the axial displacement of the tube and another of said two electrical contacts cooperating with said additional contact when said end is fully engaged in one of said cutouts to produce a signal to stop the rotation of the tube. In many instances this is sufficient to determine the location of the cutout. In some cases the cutout should be further turned together with the tube to some degree. Inasmuch as the saw blade should not engage in the cutout it is sufficient that the cutout defining the location of the cut on the tube is on the side which is opposite to the first point of engagement of the saw blade with the tube being cut. It is therefore advantageous that the cutout or mark takes the position in the plane of the saw blade exactly opposite to the blade. After the axial movement of the profile or tube ceases the second contact defines the maximal engagement of the scanning finger within the cutout and thereby an exact position of the respective cutout in the radial plane of the saw blade is determined.

It is to be understood that the single signal transmitter can be utilized in the scanning finger, which would transmit two different signals depending on the depth of engagement of the scanning finger within the cutout.

According to a further feature of the invention each scanning finger may be provided with an electrical contact, said scanning means further including an additional electrical contact common for all the scanning fingers, the first mentioned electrical contact of each scanning finger cooperating with the additional electrical contact upon pivoting of the respective scanning finger into the engagement with one of the cutouts. The common electrical contact can be a multiple contact in the conventional manner. Photo-electrical switches can be utilized. A contactless electrical switch cooperating with a counter contact by magnets can be also employed. A mechanical contact can be also utilized.

According to yet another feature of the invention the proposed device may include means for determining the distance from the cutout engaged with said one scanning finger to the saw blade upon the actuation of the respective electrical contact when each finger is provided with the respective electrical contact.

It is the advantage of the present invention that the cutout on the tube is turned, due to the rotation of the tube, to be positioned on the side of the tube opposite to the saw blade whereby the saw blade is not inserted into the cutout because otherwise it would lead in many instances to damaging the saw blade. A control device can be suggested in which a number of scanning fingers would engage in one cutout, such a device would make possible the determination of the precise stroke of the tube which is necessary to displace the tube to position the cutout in the radial plane of the saw blade.

In accordance with a further feature of the invention the drive means for rotation and axial displacement of the tube to be cut includes a rotatable friction wheel arranged in contact with the tube to be cut, said friction wheel being positionable transversely to the elongation of the tube for the rotation thereof and at an angle to the elongation of the tube for the axial displacement of the tube.

Two different drive wheels can be employed to provide the axial displacement and the rotation of the tube.

Furthermore the drive means may further include an electric motor, a transmission unit interconnected between said motor and said friction wheel for imparting a rotational movement to said wheel. Thereby the fast and precise control of the axial movement and rotational movement of the tube is obtained.

The drive means may further include a supporting plate supporting said motor with said friction wheel, and a cylinder with a piston rod coupled to said supporting plate, said supporting plate being pivotable about one axle and displaceable by said piston rod so as to position said friction wheel transversely to the elongation of the tube or at the angle to the elongation of the tube.

Furthermore, the supporting plate may be pivotable about another axle which is parallel to the elongation of the tube to be cut and normal to said one axle whereby said supporting plate is displaceable toward and from the tube to adjust said friction wheel to various diameters of the tubes being cut.

Although the aligning of the tube relative to the saw blade takes place for a very short period of time additional aligning means for aligning the tubes on their way to the saw may be provided. For this purpose the device may include an intermediate storage means and transport means for transporting the tubes to be cut to said saw blade, said transport means including a plurality of transport rollers. The intermediate storage means may include aligning means for aligning the tubes before they are received by said transport rollers.

The device according to the invention may further include means for transferring the tubes to be cut from said intermediate storage means onto said transport rollers.

The aligning means in the intermediate storage means may include an inclined bottom wall and a side wall projected upwardly from the bottom wall, a plurality of supporting balls on said bottom wall and said side wall, said balls causing the rotation and axial displacement of the tubes within the aligning means.

The bottom wall may have a concave surface.

Therefore, the intermediate storage means operates as a preliminary aligning station which can be arranged substantially in the plane of feeding the tubes to the saw. This storage means may also have a trough-like depression.

The intermediate storage device may be provided with lifting means for lifting said inclined bottom wall and adjusting the vertical positions of the tubes received on said intermediate storage means and aligning each individual tube on said bottom wall.

The transferring means may include shell-shaped claws and an arm connected to said claws and pivotable about a horizontal axis.

BRIEF DESCRIPTION OF THE DRAWINGS

FIG. 6 shows a process of scanning a pipe by scanning fingers;

FIGS. 7-9 illustrate a scanning finger in various positions relative to a pipe being scanned;

FIG. 10 shows a modified embodiment of the scanning finger;

FIG. 11 illustrates a plurality of scanning fingers applied to an elongated pipe in the first position;

FIG. 12 shows the pipe which is scanned for the producing thereon of a saw cut;

FIG. 13 is a schematic view of the pipe with a conveying device and scanning device applied thereto;

FIG. 14 is a schematic top plane view of a drive for the rotation of the pipe profile;

FIG. 15 is a view similar to that of FIG. 14 but also showing an axial displacement of the pipe profile;

DETAILED DESCRIPTION OF THE PREFERRED EMBODIMENTS

Figure 1:
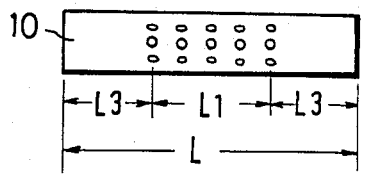
FIG. 1 shows a perforated pipe for an exhaust system.

Referring now to the drawings more specifically, FIG. 1 shows a perforated pipe 10 suitable for use in the exhaust system and having the length of 500 mm with the length of the perforated area L1 amounted to 200 mm. The distances of the perforated region of the pipe from the edges thereby are defined by the size L3 which is about 150 mm.

Figure 2:
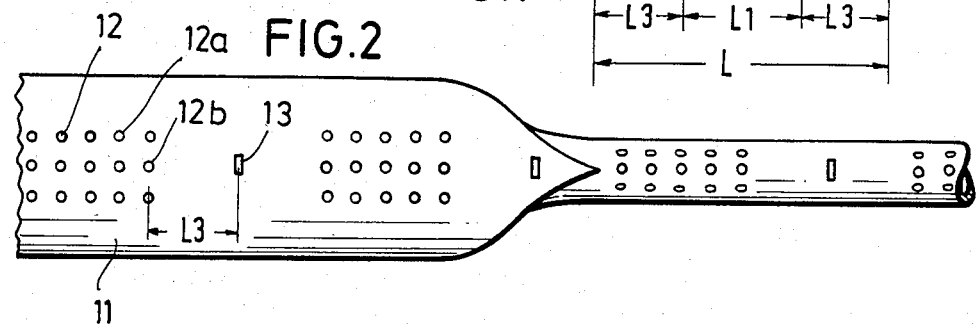
FIG. 2 illustrates a method of fabricating a perforated pipe from a tape.

FIG. 2 illustrates the method of producing a perforated pipe 10. Perforations or holes 12, 12a, 12b are made in a flat tape 11 by means of a stamping tool. In order to ensure that distance L3 be provided between the end of the perforated area and the edge of the finished pipe a transverse cutout 13 is formed at the predetermined distance L3 from the last row of holes in each perforated area. Then tape 11 is curved to obtain a tube and a weld seam is produced at the edges of the curved tube in the longitudinal direction. This process is carried out continually so that a long perforated pipe is produced, which should be further divided into pipe portions of 6, 8, 10 or 12 m. The cutouts 13 are raster marks provided at predetermined intervals on the tape and are marked on finished bent pipes.

Figure 3:
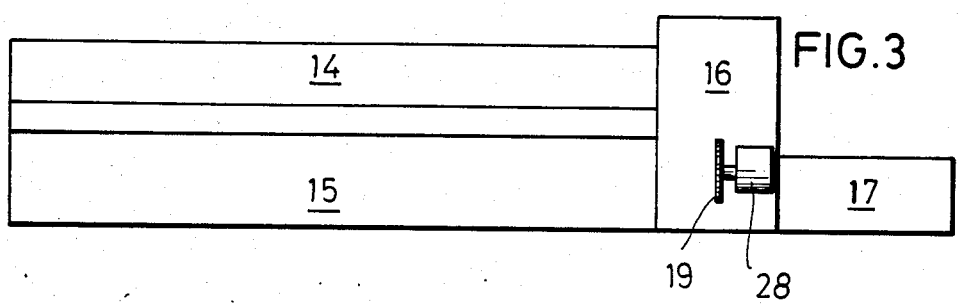
FIG. 3 is a side schematic view showing a device for dividing perforated pipes into pipe portions of predetermined length.

In order to produce pipes suitable for use in an exhaust system of a motor vehicle, for example pipes of the length of 500 mm, the elongated tube is subdivided into a plurality of sections. This takes place in a tube cutting device shown in FIGS. 3-5. This device includes a magazine 14 in which individual tubes are stored, a feeding device 15 for feeding individual pipes, a saw 16 and an outlet storage 17. A plurality of long Pipes 18, 18a, 18b are positioned in magazine 14. These pipes all have perforated regions and raster marks 13 shown in FIG. 2. The cutting of long tubes having the length from 8 to 12 m into portions is normally carried out not precisely in the radial plane of the raster marks whereby each tube, after they have been fed onto the saw blade 12, must be aligned. Such an alignment is carried out by hand. The tubes are so rotated by hand that all raster marks 13 are arranged on one side which is positioned against the working position of saw blade 19.

Figure 5:
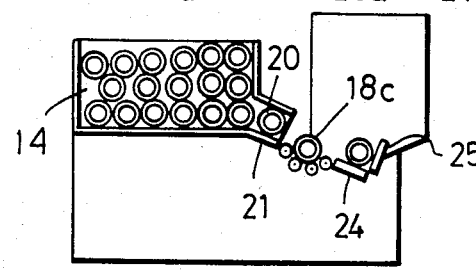
FIG. 5 is a front view of the device of FIG. 3.

FIG. 5 shows magazine 14 in which tubes are positioned randomly. These tubes leave the magazine 14 through a channel formed by an upper wall 20 and a lower wall 21 so that only one individual tube 18c can be discharged from the magazine at a time. This tube 18c is then supported on supports or rollers 22a, 22b of a storage device 22. Rollers 22a, 22b are laterally spaced from each other at sufficiently great distances. Tube 18c is engaged by a scanning device 23 at the local area of the tube and is moved to an individual control device shown in FIGS. 14 and 15 so that that local area precisely coincides with the raster mark and then stops in that position on its way toward the saw blade 19. A signal corresponding to that position is delivered to the control device.

Figure 4:
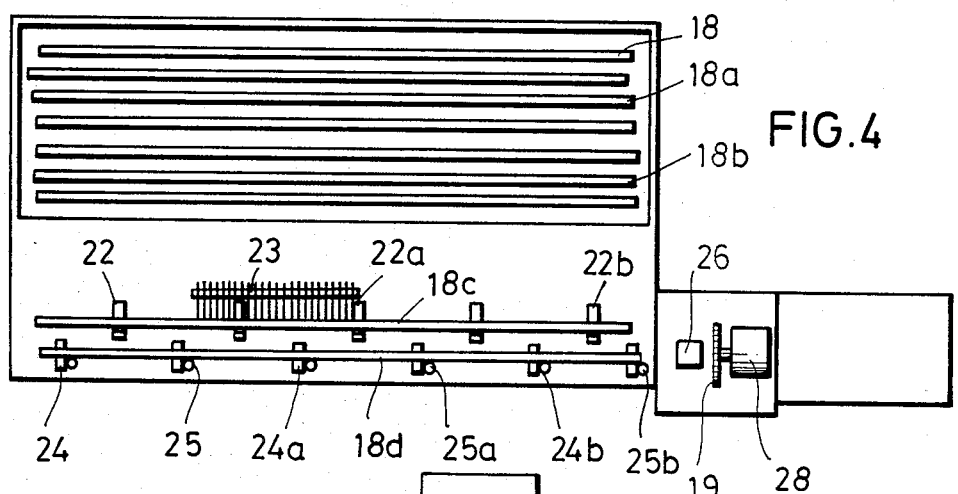
FIG. 4 is a top plane view of the device of FIG. 3.

With reference to FIG. 4 it can be seen that tube 18c is positioned in the intermediate storage device 22 which will be explained in detail herein below, and a further tube 18d is supported on substantially horizontal rollers 24, 24a and 24b and also on vertical rollers 25, 25a, 25b which operate as a transport device for feeding tubes to saw 19.

Reference numeral 26 designates a clamping jaw which cooperates with a counter clamping jaw 27 to clamp a tube to be cut therebetween as shown in FIG. 13. Reference character 28 identifies an adjustment device for the saw blade which is driven by an electromotor 29 which can be observed in FIGS. 12 and 13. Since the adjustment device and the drive of the saw blade are commonly known they are not described herein in detail.

The basic principle of the present invention can be explained in connection with FIGS. 11-13. Tube 18c of the length, for example of 10 m, has raster marks 13, 13a, 13b, 13c spaced at intervals of about 50 cm, which define the length L of the finished perforated tube 10. Tube 18c has an edge 30 which is spaced from the closest raster mark 13.

The scanning device 23 has an elongated axle 31 which extends in parallel with the axis of elongation of tube 18c. A number of scanning fingers 32, 32a, 32b are pivotally positioned on axle 31. The scanning fingers are spaced from each other at equal intervals. The scanning device extends along the tube over the length of 80 cm. If 120 scanning fingers are provided in device 23 the distance between two neighboring fingers amounts to 5 mm or 1 cm. The length of the scanning device as well as the intervals between the scanning fingers can be adjusted in the usual fashion to the length of the cut tube section. One can assume that the length of the scanning device with the scanning fingers is greater than the distance between each two adjacent raster marks 13 and 13a.

Tube 18c with the scanning fingers lying thereon is rotated and moved in the longitudinal direction. The displacement of tube 18c is usually carried out in the direction of feeding tube 18 toward saw blade 19. However, the longitudinal displacement in the counter direction can also be performed. Upon the rotation and longitudinal displacement of the tube one of the scanning fingers becomes engaged in one of the cutouts or raster marks 13. It is also possible that two scanning fingers be engaged in the respective cutouts. This can happen if two scanning fingers are spaced from each other a distance corresponding to the distance between two cutouts 13. In the instance shown in FIG. 11 the interval between fingers 32 and 32b corresponds to the distance between adjacent cutouts 13b and 13c.

The view of FIG. 6 corresponds to that of FIG. 11 in that finger 32b is engaged in cutout 13b. The various positions of finger 32b with respect to the tube being scanned will be explained in connection with FIGS. 7 to 9. Tube 18c having cutouts 13 is rotated in the direction of arrow 33 and at the same time is displaced longitudinally. The displacement in the lengthwise direction at this time is insignificant. This displacement has the course of a helical line due to the rotation of the tube. In the view of FIG. 7 the finger 32 lies tangentially on the outer periphery of tube 18c. The tube shown in FIG. 8 has been turned in the direction of arrow 33 relative to the position shown in FIG. 7 so that cutout 13 lies below the end of finger 32b and the latter is partially engaged in this cutout. The end of the finger 32b in its position in FIG. 9 is fully engaged in cutout 13 and the surface 34 of the tube comes into contact with the front face 35 of the finger 32b and presses against that face in the direction elongation of the finger.

A double-armed finger 32b pivotable about the axle 31 has at the outer end thereof a contact surface in the form of the edge 36, which surface is spaced a greater distance from a contact strip 37 in the position of the scanning finger of FIG. 7 and spaced a smaller distance from strip 37 in the position of FIG. 8. In the position shown in FIG. 9 contact surface 36 abuts against strip 37 so that an impulse signal is generated which stops the rotation of the tube. In the position of FIG. 7 the tube is rotated and simultaneously is displaced axially. If, as shown in FIG. 8, the end of the scanning finger is partially engaged within cutout 13 this means that the axial displacement of the tube is no longer necessary because the local position of the cutout in the longitudinal direction of the tube has been scanned. In the position of FIG. 8 the scanning finger generates the first impulse which ceases the axial displacement of the tube. A further impulse is produced by the scanning finger when it is in the position of FIG. 9; this further impulse ceases the rotational movement of the tube.

FIG. 10 illustrates a modified embodiment of the invention, in which two different signals can be produced by means of two contacts 38 and 40 provided on the end face of scanning finger 32b and a counter contact 39 provided on the contact device 80. When first contact 38 cooperates with counter contact 39 the signal will be produced which would cease the rotational movement of the tube.

The above described contact sensor could be mechanical. Also suitable would be a contactless electromagnetic switch. A photocell control device could be also utilized as a sensor on the scanning finger.

According to the principle explained in connection with FIGS. 7-9 it is always warranted in the proposed device that cutouts 13 will always turn to be at the top of the tube.

FIG. 12 shows the position in which the saw blade 19 is in alignment with one of the raster marks or cutouts 33. A contact scanning finger 41 is provided in the device, which is pivotable about a pivot pin 42 extended transversely to the elongation of the tube being processed. Contact finger 41 has a hardened projection 43 which engages in cutout 13 when the latter reaches the position against the saw blade. Projection 43 is provided in the radial plane of saw blade 19. Therefore, it is ensured that the saw blade 19, which has for example the width of 2 mm, makes a cut precisely in the radial plane of the cutout 13, the width of which is about 1.5 mm.

Since finger 32 is engaged in cutout 13b as shown in FIG. 11 it is possible with the aid of a conventional computer to determine the distance from the cutout 13b to the radial plane of saw blade 19. The radial plane of saw blade 19 is defined by the line 44. This radial plane will be hereafter identified as a zero plane. By determining the local position of cutout 13b the position of the first cutout 13 and the distance between this first cutout and the zero plane will be also defined. Thereby, the stroke of the tube in the longitudinal direction, which is necessary to make the first cut in the plane of cutout 13 will be determined. First, a quick displacement of the tube at a predetermined distance toward plane 44 takes place. Then a slow intermittent back and forth movement within the distance of about 2 cm is imparted to tube 18c so that projection 43 of scanning finger 41 can engage with cutout 13. The fast displacement and slow displacement of the tube is provided by means of drive rollers 45a and 45. The path of the tube in the opposite direction is defined by a measuring wheel 46. As soon as projection 43 of scanning finger 42 engages with cutout 13 the displacement of the tube is ceased. The clamping jaws 26 and 27 then are moved toward each other to clamp the tube. Saw blade 19 is fed toward the tube to make a cut and scanning finger 41 is simultaneously pivoted in the upward direction to come out of engagement with cutout 13.

Then the quick displacement of the tube a distance, of for example 48 cm according to the interval between the raster marks, amounted to 50 cm is performed. In order to ensure that the tube will be displaced at the required distance which is necessary to position the next raster mark against the saw blade an end switch 48 pivotable on a pivot axle 47 is provided, which is switched off during the quick displacement of the tube and switched on during the intermittent slow movement of the tube so as to ensure that projection 43 of scanning finger 41 will engage in the following cutout 13a and tube will stop before a cut thereon is produced.

FIGS. 14 and 15 show a drive for rotation and axial displacement of the tubes. This drive includes a friction wheel 49 connected to a transmission unit 51 which in turn is connected to an electric motor 50. This drive is positioned on a supporting plate 52 which is pivotable about a pivot pin 53. A piston rod 54 of a hydraulic or pneumatic cylinder 55 is coupled with plate 52. Cylinder 55 is pivotally mounted to a machine frame 56 by means of a pin 57. In order to adjust the drive wheel 49 to various diameters of the tubes being cut a pivot pin 53 is connected to plate 58 which can be lifted and lowered by a horizontal pivot pin 59 mounted in the machine frame portion 60.

FIG. 14 illustrates the position in which the drive wheel 49 extends at right angles to the axis of elongation of the tube whereby a rotational movement is imparted to the tube upon rotation of wheel 49 caused by electric motor 50. In the position shown in FIG. 15 the drive wheel 49 is pivoted together with supporting plate 53 upon displacing of the latter by piston rod 54 of cylinder 55 and wheel 49 is angularly displaced at about 3 degrees from its initial position whereby the tube in addition to its rotation will be axially displaced in the direction of arrow 61.

Figure 16:
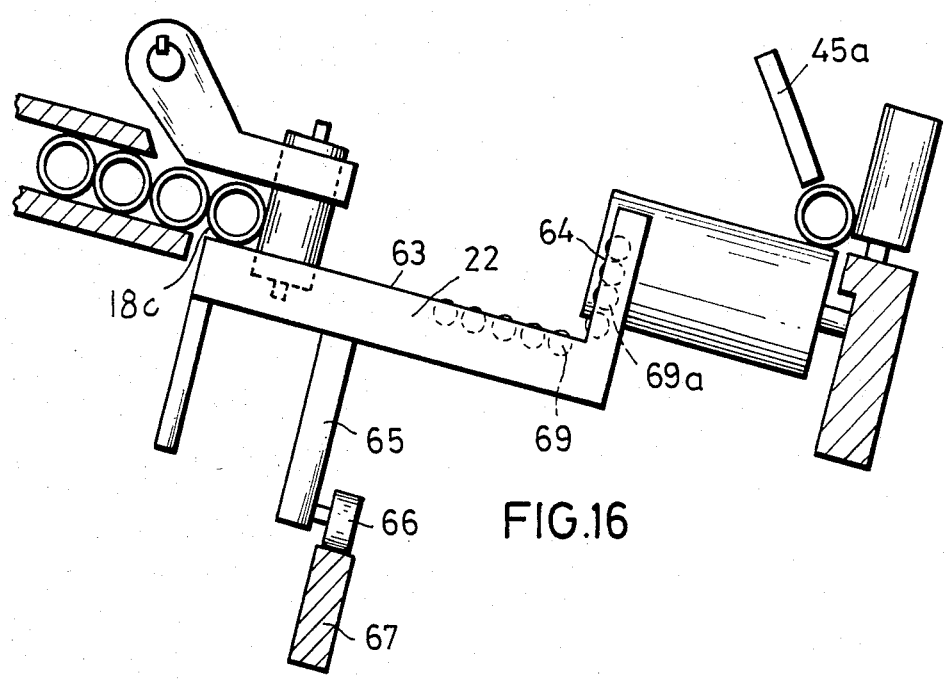
FIG. 16 is a schematic view of a pipe-aligning device.
Figure 17:
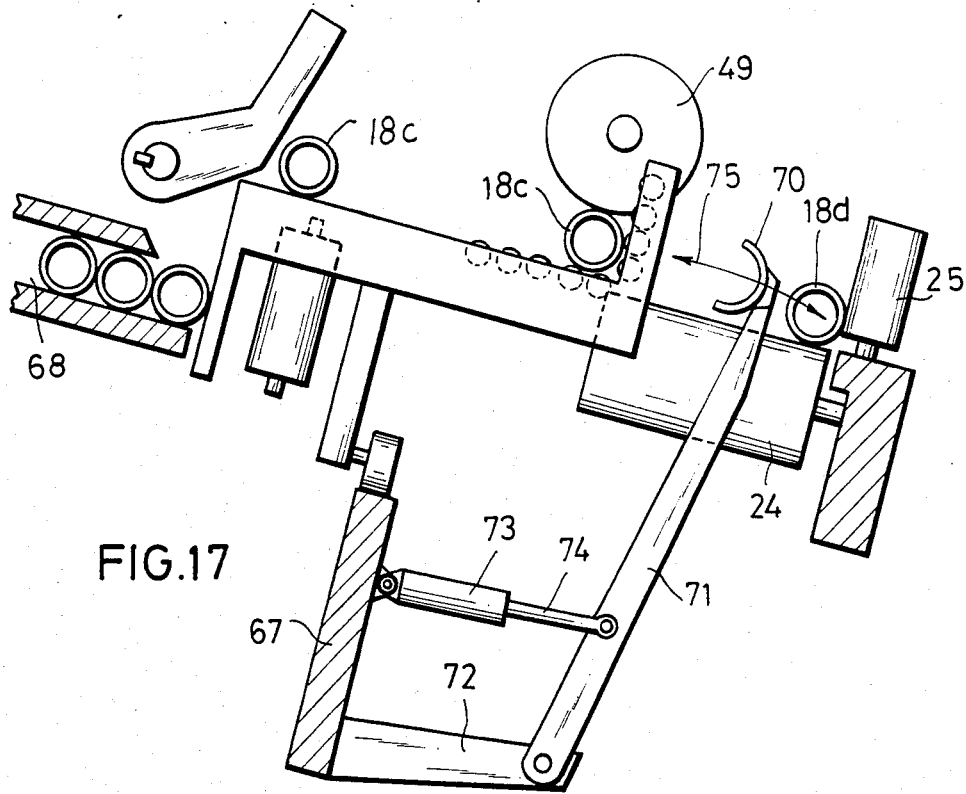
FIG. 17 shows the pipe-aligning device in connection with the drive means.

Reference is now made to FIGS. 16 and 17 which illustrate an alignment of the tubes in the intermediate storage arrangement 22 mentioned above and which has an inclined bottom surface 63 and a side wall 64 extended normally to the bottom wall 63. The intermediate storage device is provided for supplying tubes toward the transport position in which tubes are cut into sections. This device has at the lower side thereof a bar 65 which carries at its end a number of rotatable wheels 66 positioned one behind another. These wheels are displaceable in the longitudinal direction along the profile of a rail 67 and are in contact with rail 67. Upon moving of the rail 67 in the upward direction the intermediate storage device 22 will be lifted whereby a tube 18c positioned on the end surface portion of bottom wall 63 is separated from the remaining tubes in the feed passage 68 and is removed from that passage. A plurality of balls 69a are arranged on the bottom wall 63 and side wall 64 of the storage device 22. Balls 69, 69a ensure the rotation and simultaneous displacement of the tube 18c on the bottom wall 63 in the direction of side wall 64.

Drive wheel 49 seen in FIG. 17 lies against the tube 18c whereas tube 18b lies on roller 24 and is laterally supported by roller 25 to be transported toward the saw blade as has been described in connection with FIG. 4. The transition of each tube from the intermediate storage device 22 to the transporting means 24, 25 is carried out by shell-shaped claws 70 which are mounted on the end of a lever 71. The latter is pivotally mounted to rail 67 by means of another lever 72 and is driven by a cylinder 73 with a piston rod 74 coupled to the lever 71 in the middle thereof so that lever 71 is able to pivot in two opposite directions shown by double-headed arrow 75. It is to be understood that shell-shaped claws 70 are arranged between the rollers 22a, 22b of the intermediate storage device 22 and transport rollers 24, 24a also shown in FIG. 4 so that a simple transfer of tube 18c from rollers 22a, 22b onto transport rollers 24 for a further transport to the saw blade 19 is possible.

If the distance between cutout 13 and the perforated region on the tube being processed differs from the required one then the saw blade is displaced insignificantly in the longitudinal direction of the tube while the projection 43 of scanning finger 41 is engaged in the respective cutout whereby the position of the saw blade is adjusted to the distance between the cutout and the perforated region of the tube.

It will be understood that each of the elements described above, or two or more together, may also find a useful application in other types of aligning devices differing from the types described above.

While the invention has been illustrated and described as embodied in an aligning device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for aligning elongated profiles, particularly tubes having perforated portions, with a saw blade for cutting tubes into tube sections, wherein elongated tubes are provided with cutouts spaced from each other at equal intervals and defining raster marks at which tubes are to be cut into tube sections, the aligning device comprising scanning means including a plurality of scanning fingers mounted in contact with the elongated tube to be cut into tube sections and spaced from each other along the elongation of the tube a distance substantially smaller than the interval between adjacent cutouts on the tube; and drive means for rotation and axial displacement of each tube, at least one of said scanning fingers being engageable in one of said cutouts upon the rotation and axial displacement of the tube.

2. The device as defined in claim 1, wherein said scanning means further includes a pivot shaft pivotally supporting said scanning fingers, said shaft extending in parallel with the elongated tube to be cut.

3. The device as defined in claim 2, wherein each scanning finger is provided with an electrical contact, said scanning means further including a plurality of additional electrical contacts each cooperating with the respective first mentioned electrical contact upon pivoting of the respective scanning finger into the engagement with one of said cutouts.

4. The device as defined in claim 2, wherein each of said scanning fingers is a lever having a first arm and a second arm both supported on said pivot shaft, said first arm having an end engageable in one of said cutouts, said second arm including two electrical contacts, said scanning means further including an additional electrical contact, one of said two electrical contacts cooperating with said additional contact when said end is partially engaged in one of said cutouts to produce a signal to stop the axial displacement of the tube, and another of said two electrical contacts cooperating with said additional contact when said end is fully engaged in one of said cutouts to produce a signal to stop the rotation of the tube.

5. The device as defined in claim 2, wherein each scanning finger is provided with an electrical contact, said scanning means further including an additional electrical contact common for all the scanning fingers, the first mentioned electrical contact of each scanning finger cooperating with said additional electrical contact upon pivoting of the respective scanning finger into the engagement with one of said cutouts.

6. The device as defined in claim 3, further including means for determining the distance from the cutout engaged with said one scanning finger to the saw blade upon the actuation of the respective electrical contact.

7. The device as defined in claim 1, wherein said drive means for rotation and axial displacement of the tube to be cut includes a rotatable friction wheel arranged in contact with the tube to be cut, said friction wheel being positionable transversely to the elongation of the tube for the rotation thereby and at an angle to the elongation of the tube for the axial displacement of the tube.

8. The device as defined in claim 7, wherein said drive means further includes an electric motor, a transmission unit interconnected between said motor and said friction wheel for imparting a rotational movement to said wheel.

9. The device as defined in claim 8, wherein said drive means further includes a supporting plate supporting said motor with said friction wheel, and a cylinder with a piston rod coupled to said supporting plate, said supporting plate being pivotable about one axle and displaceable by said piston rod so as to position said friction wheel transversely to the elongation of the tube or at the angle to the elongation of the tube.

10. The device as defined in claim 9, wherein said supporting plate is pivotable about another axle which is parallel to the elongation of the tube to be cut and normal to said one axle whereby said supporting plate is displaceable toward and from the tube to adjust said friction wheel to various diameters of the tubes being cut.

11. The device as defined in claim 1, further including an intermediate storage means and transport means for transporting the tubes to be cut to said saw blade, said transport means including a plurality of transport rollers.

12. The device as defined in claim 11, wherein said intermediate storage means includes aligning means for aligning the tubes before they are received by said transport rollers.

13. The device as defined in claim 12, further including means for transferring the tubes to be cut from said intermediate storage means onto said transport rollers.

14. The device as defined in claim 13, wherein said aligning means in said intermediate storage means includes an inclined bottom wall and a side wall projected upwardly from said bottom wall, a plurality of supporting balls on said bottom wall and said side wall, said balls causing the rotation and axial displacement of the tubes within said aligning means.

15. The device as defined in claim 14, wherein said intermediate storage device is provided with lifting means for lifting said inclined bottom wall and adjusting the vertical positions of the tubes received on said intermediate storage means and aligning each individual tube on said bottom wall.

16. The device as defined in claim 13, wherein said transferring means includes shell-shaped claws and an arm connected to said claws and pivotable about a horizontal axis.

* * * * *